US010259661B2

(12) United States Patent
Overley et al.

(10) Patent No.: US 10,259,661 B2
(45) Date of Patent: Apr. 16, 2019

(54) APPARATUS AND PROCESS FOR ROTATING PRODUCTS

(71) Applicant: The Procter & Gamble Company, Cincinnati, OH (US)

(72) Inventors: Matthew Bernard Overley, Deerfield Township, OH (US); Wesley Bernard Brokopp, Jr., Liberty Township, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 41 days.

(21) Appl. No.: 15/597,254

(22) Filed: May 17, 2017

(65) Prior Publication Data

US 2017/0334660 A1 Nov. 23, 2017

Related U.S. Application Data

(60) Provisional application No. 62/337,442, filed on May 17, 2016.

(51) Int. Cl.
*B65G 47/244* (2006.01)

(52) U.S. Cl.
CPC ....... *B65G 47/244* (2013.01); *B65G 47/2445* (2013.01); *B65G 2201/0232* (2013.01)

(58) Field of Classification Search
CPC .............. B65G 47/244; B65G 47/2445; B65G 2201/0232
See application file for complete search history.

(56) References Cited

U.S. PATENT DOCUMENTS

| 3,823,811 | A | * | 7/1974 | Brockmuller | ........ B65G 47/244 198/382 |
| 4,077,179 | A | * | 3/1978 | Lancaster | ............. B65B 11/045 100/15 |
| 4,545,476 | A |   | 10/1985 | Calvert | |
| 4,679,379 | A |   | 7/1987 | Cassoli | |
| 5,553,442 | A |   | 9/1996 | Fadaie | |

(Continued)

FOREIGN PATENT DOCUMENTS

| DE | 12 12 854 B | 3/1966 |
| DE | 10 2008 007441 B3 | 7/2009 |
| DE | 20 2011 110089 | 1/2013 |

OTHER PUBLICATIONS

PCT International Search Report dated Aug. 24, 2017—5 pages.

(Continued)

*Primary Examiner* — Mark A Deuble
(74) *Attorney, Agent, or Firm* — Andrew J. Mueller

(57) ABSTRACT

A conveying system and method for rotating conveyed product. The system can have a conveyor on which is conveyed a rolled product in a machine direction. The system can have conveyor having a first portion on which is conveyed a rolled product having an axis oriented in the machine direction, and the rolled product being partially wrapped in an open ended tube of polymer film. The system has a second portion on which the rolled product is rotated in a horizontal plane such that its axis is oriented in a cross machine direction, and a third portion on which the rolled product is conveyed while oriented in the cross machine direction to a sealing operation that seals the open ends of the tube of polymer film.

25 Claims, 4 Drawing Sheets

(56) References Cited

U.S. PATENT DOCUMENTS

| | | | |
|---|---|---|---|
| 5,873,450 A * | 2/1999 | Rusch | B65G 47/252 |
| | | | 198/415 |
| 2007/0107385 A1 | 5/2007 | Dall'omo et al. | |
| 2009/0218193 A1 | 9/2009 | Malini | |
| 2014/0026524 A1 | 1/2014 | Rooyakkers | |
| 2015/0329230 A1 | 11/2015 | Rasi | |
| 2017/0210572 A1* | 7/2017 | Alberti | B65G 43/08 |
| 2018/0148271 A1* | 5/2018 | Svenningsen | B65G 15/22 |

OTHER PUBLICATIONS

PCT International Search Report dated Aug. 23, 2017—6 pages.
All Office Actions U.S. Appl. No. 15/371,547.
U.S. Appl. No. 15/371,547, filed Dec. 7, 2016, Matthew Bernard Overley.

* cited by examiner

APPARATUS AND PROCESS FOR ROTATING PRODUCTS

FIELD OF THE INVENTION

The present invention is related to apparatuses and processes for conveying and rotating rolled products, including packaged rolled products such as rolled toilet paper and paper towels.

BACKGROUND OF THE INVENTION

Products made from absorbent fibrous webs are used for a variety of purposes. For example, rolled absorbent products such as paper towels and toilet tissues are in constant use in modern industrialized societies. Such rolled products, as well as related products including facial tissues, napkins, and the like, are typically packaged for retail sale in flexible polymer packaging. Packaging can include single rolls in a polymeric film wrapper or packages of multiple rolled products bundled into a single larger polymeric film wrapper.

Current approaches to forming packages of rolled products include well known "flow wrap" technologies. Flow wrappers have an infeed mechanism, such as a conveyor or pushing device, a film feed assembly, a forming area, a cutting head, and a discharge area. Product to be wrapped is placed on the infeed conveyor, which moves generally horizontally to deliver product to a forming area. A single film can be drawn from a film feed assembly into the forming area, where the film is formed over a forming horn into a tube around the product as the product is pushed into the tube. The tube can be sealed along its edges to form a partially sealed package, the partially sealed package still being open at two its two ends after the film is cut at the trailing end. For certain packages, including packages of rolled products, after forming the partially sealed packages the partially sealed packages are directed at a 90-degree angle into an end sealer apparatus, which closes and seals the open ends of each tube, thereby creating a completely closed package.

In current systems that use conveying systems to move products and packages, the 90-degree re-direction is achieved by a mechanism that transfers product to a discharge mechanism that is perpendicular to the infeed, such that the two open ends of the partially sealed package which were oriented in line with the direction of the conveyor, are oriented orthogonally to the direction of travel, i.e., toward the two sides of the conveyor. The two open ends are then folded and sealed to form a finished package. Such conveyors necessitate an L-shape configuration, as described in co-owned and co-pending application Ser. No. 12/680,276, filed Nov. 19, 2012 in the name of Overley et al.

While L-shaped conveyors for flow wrapping packaging are very common and useful for packaging rolled products, the requirement that the conveying path be L-shaped presents at least two problems. First, the L-shape disrupts a linear path, increasing the "footprint" or floor space necessary for the conveying equipment. Often the packaged rolled products that are diverted from a first direction to a second direction at a right angle, need to be reintroduced into a conveying path in the first direction with additional right-angle turns. Secondly, the L-shaped deviation from a linear conveying path can work against a manufacturer's desire for modularity in a line of modular unit operations related to conveying, arranging, packaging, and bundling of rolled products.

Certain packages of rolled products, particularly packages of multiple rolls, that can lie flat with a relatively large package area resting on the conveyor belt can be turned by way the use of a conveying system having two side-by-side conveyer belts that can be driven at different speeds. By driving one of the belts faster than the other, the product that spans both belts will be caused to rotate in the plane of the moving belts. By controlling the relative speeds of the belts, the a partially wrapped package of rolled product can be made to rotate a predetermined rotation, such as 90 degrees, through a conveying distance, and thereafter conveyed in a straight path into a folder/sealer operation for final folding and sealing.

The problem with two side-by-side conveyer belts that can be driven at different speeds is with respect to small or dimensionally narrow products, such as single rolls of rolled product. Specifically, a rolled product having dimensions typically associated with paper towels or toilet paper, when oriented such that the length dimension is parallel with the direction of conveyance, will sit in the gap between the two side-by-side belts, and will resist rotation. Furthermore, rotation is not as controlled, as the partially rotated rolled product tends itself to roll (i.e. spin about its axis) on the conveyor belt, thereby changing position during conveyance.

Accordingly, there is an unmet need for a conveying system for flow wrapping rolled products that eliminates the need for an L-shaped conveying path.

Further, there is an unmet need for a conveying system that can reliably handle both individual rolled products and packaged products of multiple rolled products.

SUMMARY OF THE INVENTION

A conveying system and method for rotating conveyed product is disclosed. The system can have a conveyor on which is conveyed a rolled product in a machine direction. The system can have conveyor having a first portion on which is conveyed a rolled product having an axis oriented in the machine direction, and the rolled product being partially wrapped in an open ended tube of polymer film. The system has a second portion on which the rolled product is rotated in a horizontal plane such that its axis is oriented in a cross machine direction, and a third portion on which the rolled product is conveyed while oriented in the cross machine direction to a sealing operation that seals the open ends of the tube of polymer film.

DETAILED DESCRIPTION OF THE INVENTION

The present invention is an improvement to flow wrap packaging apparatuses and processes. The apparatus rotates partially wrapped/sealed rolled products 90 degrees for final end-seal operations without the need for a 90-degree turn in the conveyor system.

Figure 1:
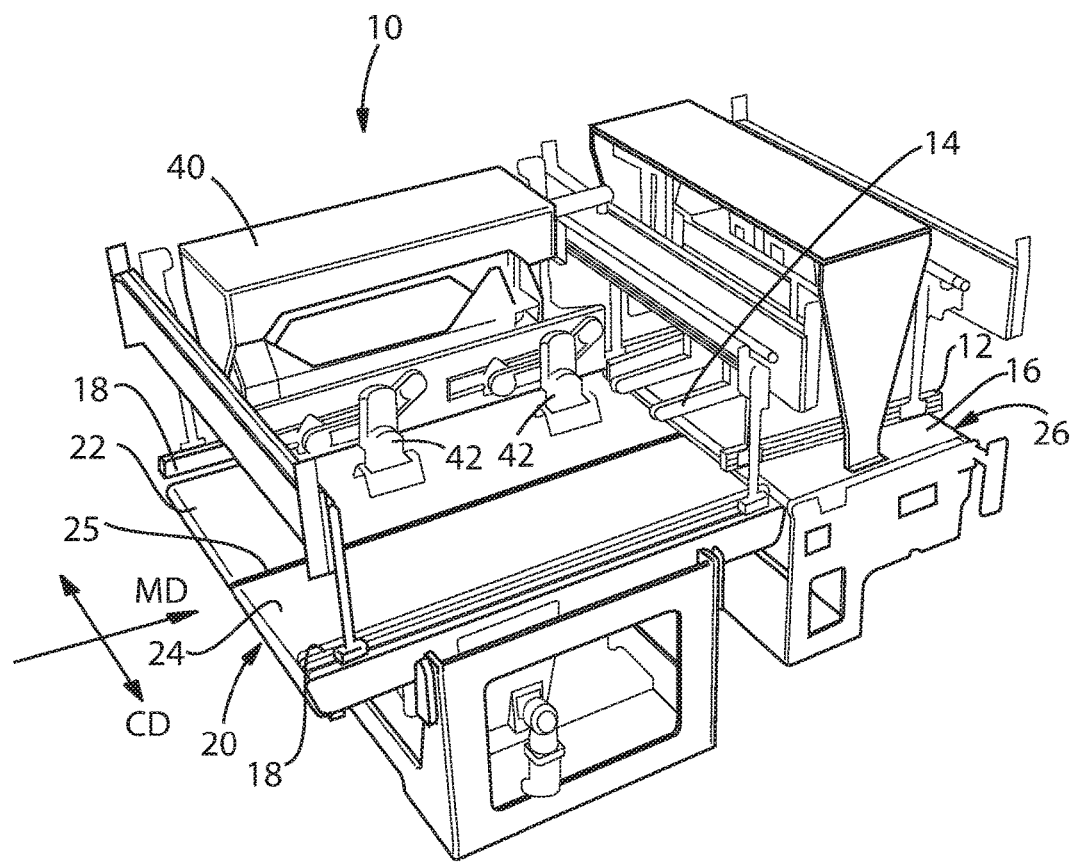
FIG. 1 is a perspective view of a of an apparatus of the present invention.

An apparatus 10 for rotating rolled products and packages of rolled products 90 degrees during conveyance in a flow wrap packaging system is shown in FIG. 1. The apparatus can have three major components: (1) a product rotation portion 20; (2) a product end sealing portion 26; and, (3) as part of the product rotation portion 20, an overhead rotator portion 40.

The product rotation portion 20 can have two side-by-side conveyors 22 and 24, and side guide rails 18. The product end sealing portion 26 can also have a pair of side rails 12, and at least one product sealing conveyor 16. Additionally the product end sealing portion 26 can have at least one overhead conveyor-like belt 14 that serves to stabilize rotated product by applying pressure to the product while it moves at the same rate as product sealing conveyor 16.

The product rotation portion 20 can be fed by any of known infeed conveyors (not shown). In an embodiment the conveyor of the product rotation portion, extended upstream, also serves as the infeed conveyor. The conveyors, including an infeed portion, move in a machine direction MD and move partially wrapped rolled absorbent products from the first stage of a flow wrapper (not shown), such that the partially wrapped rolled absorbent products are enclosed in an open-ended tube of polymer film when they enter product rotation portion 20. The partially wrapped rolled absorbent products can be one or more rolled absorbent products that are enclosed in a tube of polymer film having the two ends of the film open and ready for folding and sealing in the next stage of the packaging process.

Figure 2:
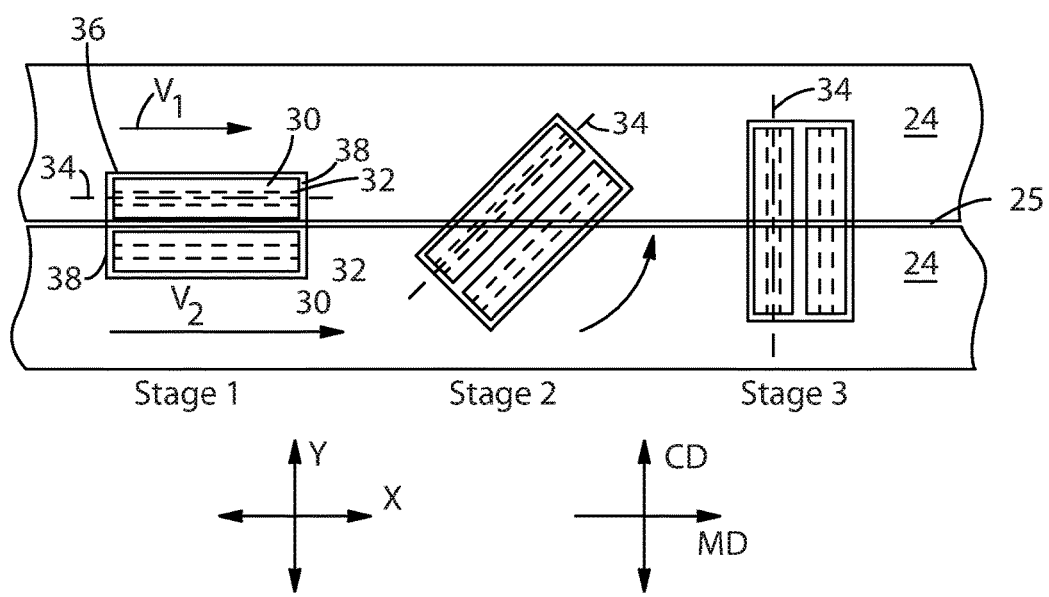
FIG. 2 is a plan schematic view of a turning conveyor.

In general, as shown schematically in the plan view of FIG. 2, the rolled absorbent products 30 can be oriented such that they each enter the product rotation portion 20 with their respective axes of their center winding oriented in a machine direction MD. That is, if the rolled absorbent product 30 has a cardboard core 32 upon which it is rolled, the axis 34 of the core 32 can be oriented in the machine direction MD. The partially wrapped rolled absorbent product enters the product rotation portion 20 after having been through the first stage of a flow wrapper, such that the rolled absorbent product(s) is enclosed in a tube of polymer film 36, the tube having two open ends 38. In the embodiment shown in FIG. 2, two rolled absorbent products 30, which can be two rolls of paper towels, for example, are shown.

As shown in plan view FIG. 2, product rotation portion 20 can have two side-by-side conveyor belts 22 and 24, each moving in the machine direction MD and separated by space 25 between the two conveyor belts, which space can be from about 1 mm to about 25 mm. First conveyor belt 22 can be run in the machine direction MD at a speed V1, and second conveyor belt 24 can be independently run in the machine direction V2, which can be greater than V1. As depicted in a sequence from Stage 1 to Stage 3 in FIG. 2, the relatively faster velocity V2 of conveyor belt 24 (and the relatively slower velocity V1 of conveyor belt 22) serves to cause the partially wrapped rolled products to rotate, in this case, counter clockwise when viewed from above. The distance travelled in the machine direction MD can be predetermined and controlled, such that upon a 90-degree rotation, as shown at Stage 3 in FIG. 2, the rotated package can be transferred to the product end sealing portion 26 of the apparatus 10 on another conveyor system, such that the rotation ends. As such, the axes of the center of each rolled absorbent product 30, such as axis 34 of the cardboard tube 32, are oriented in the cross machine direction CD, perpendicular to the machine direction MD. In this orientation, the partially wrapped package can be processed through the next stage of the flow wrapper in which the open ends 38 of the polymer tube 36 can be folded and sealed in a manner known in the art of flow wrappers.

As can be understood, the apparatus as illustrated permits product rotation to occur in a linear conveyance path, without the requirement that the conveyance path make a right angle, e.g., an L-shaped path. Such a linear path is beneficial in providing for better utilization of manufacturing floor space, and permitting modular unit operations to be designed in a linear-path system.

In general, two or more rolled absorbent products having gone through the first stage of a flow wrapper and laying flat on at least one broad side can have a generally rectangular "footprint" on the conveying system having an area dimension that sufficiently spans both the a first and second conveyor belts 22 and 24 such that the effect of the gap 25 is minimal and product rotation can occur repeatedly and reliably. But relatively small footprint packages, including partially wrapped packages of a single roll of rolled absorbent product can be challenging to repeatedly and reliably rotate. The single roll of absorbent product tends to ride in the gap between the belts 22 and 24 with little of the package surface area being in sufficient contact with either belt to reliably turn 90 degrees. Also, the cylindrical nature of a single roll makes it prone to rolling out of place on a moving conveyor even if rotation does happen. The problems are exacerbated with relatively smaller rolls.

Figure 3:
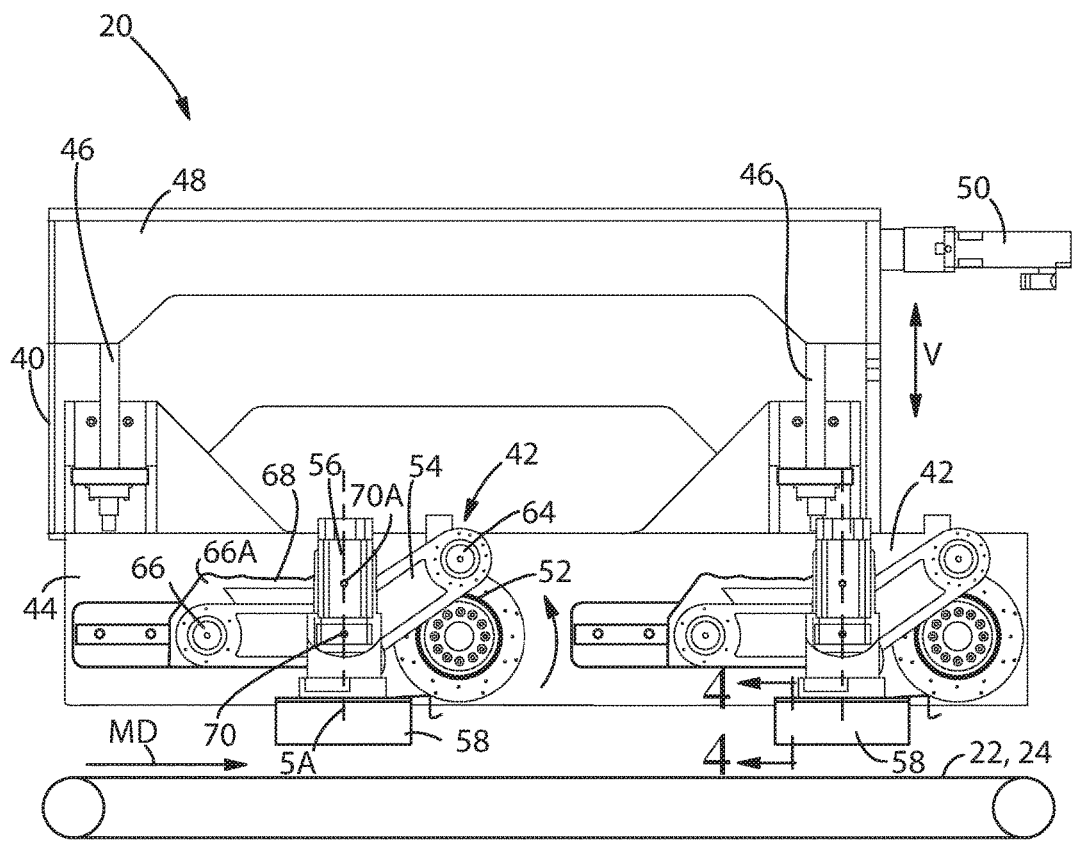
FIG. 3 is a an elevation view of a portion of the apparatus of the present invention.

For this reason, as shown in FIG. 3, the product rotator portion 20 includes an overhead rotator portion 40. The overhead rotator portion 40 can have at least one moveable rotator assembly 42, the rotator assembly 42 can be moveable relative to a height adjustable frame 44, which is moveable via attached vertically oriented adjusting shafts 46 to a stationary frame 48. A drive motor 50 can be coupled to the height adjustable frame 44 to move it up or down vertically V as necessary to adjust the working distance of the rotator cup 58 (described in more detail below) relative to the conveyor belts 22 and 24.

Mounted on the height adjustable frame 44 is at least one rotator assembly 42. Two rotator assemblies are shown in FIG. 3. The rotator assembly 42 comprises a rotary crank arm 52 connected to linkage 54 which supports and drives an MD-reciprocating motion of rotator motor 56 (i.e., the second motor) which itself drives the horizontal rotating motion of a rotator cup 58. Rotator motor 56, or any other motor detailed herein, may be any type of motor known in the art, for example, a servo motor, AC motor, DC motor, pneumatic motor, and hydraulic motor. In one particular form of apparatus 10, rotator motor 56 is a servo motor. In operation, as conveyors 22 and 24 (or a single conveyor) move in an MD direction (left to right as shown in FIG. 3), a crank arm motor (i.e., the first motor, not shown, but mounted behind the apparatus as shown in FIG. 3) turns the output shaft of which turns rotary crank arm 52 in a counter-clockwise (in the embodiment of FIG. 3) motion. The rotary crank arm need not rotate in a consistent rotational velocity, but can be slowed or sped up as necessary for the desired cycle time and motion of the MD-reciprocation of rotator motor 56. The rotary crank arm 52 is connected to a first end 64 of linkage 54, and through its rotary motion slides a second end 66 of linkage 54 in a linear, reciprocating MD-direction motion.

Vertically offset from second end 66 is a first secondary linkage end 66A for secondary linkage 68. A second secondary linkage end 70A of secondary linkage 68 (not shown, as it is behind motor 56 in FIG. 3) is vertically offset from a rotator motor connection, but depicted in FIG. 3 at the location 70. The vertical offset of rotator motor connection 70 and second secondary linkage end 70A align with the axis SA of the rotator motor 56, which remains substantially vertically oriented in use.

Figure 4:
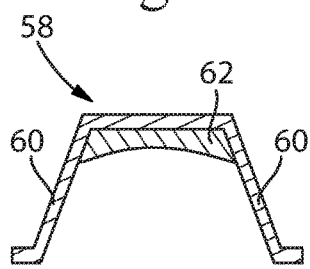
FIG. 4 is a cross sectional view of 4-4 in FIG. 3.

As can be understood from the above description in light of FIG. 3, as the rotary crank arm 52 rotates the rotator motor 56 travels in a path having both a vertical vector component and horizontal (i.e., MD) vector component. Further, as the motor 56 travels in a somewhat elliptical path in a vertical plane, the rotator cup 58 rotates in a horizontal plane. The rotator cup 58 is shown in cross section in FIG. 4. While not being limited to only this configuration, in one form, the rotator cup is generally U-shaped, having two flanges 60, and optionally a shaped member 62 integrated in the top of the rotator cup 58, the shaped member 62 taking generally the shape of a portion of the individual rolled product to be turned. In another form, rotator cup 58 may be sized and shaped to grip formats of differing numbers of rolls of product that are bundled in an open-ended tube of polymer film. In this form, the flanges 60 themselves, and/or the distance between flanges, may be adjustable. In another form, the rotator cup may be adjustably sized and shaped to grip both individual rolls and formats of differing numbers of rolls of products. In this form, the flanges 60 may be split to accommodate a single roll in an open-ended tube of polymer film and/or a multiple number of rolls that are bundled together in an open-ended tube of polymer film. The rotator cup 58 can be made of any material suitable for turning rolled products, including spring steel and plastic. Spring steel can be stiff enough to reliably turn the rolled product, but flexible enough to have some give outwardly for relatively larger roll sizes. The rotator cup 58 may also have end guides to assist in registering (e.g., centering) the rolled product in the rotator cup prior to, or as the cup rotates the product.

Figure 5:
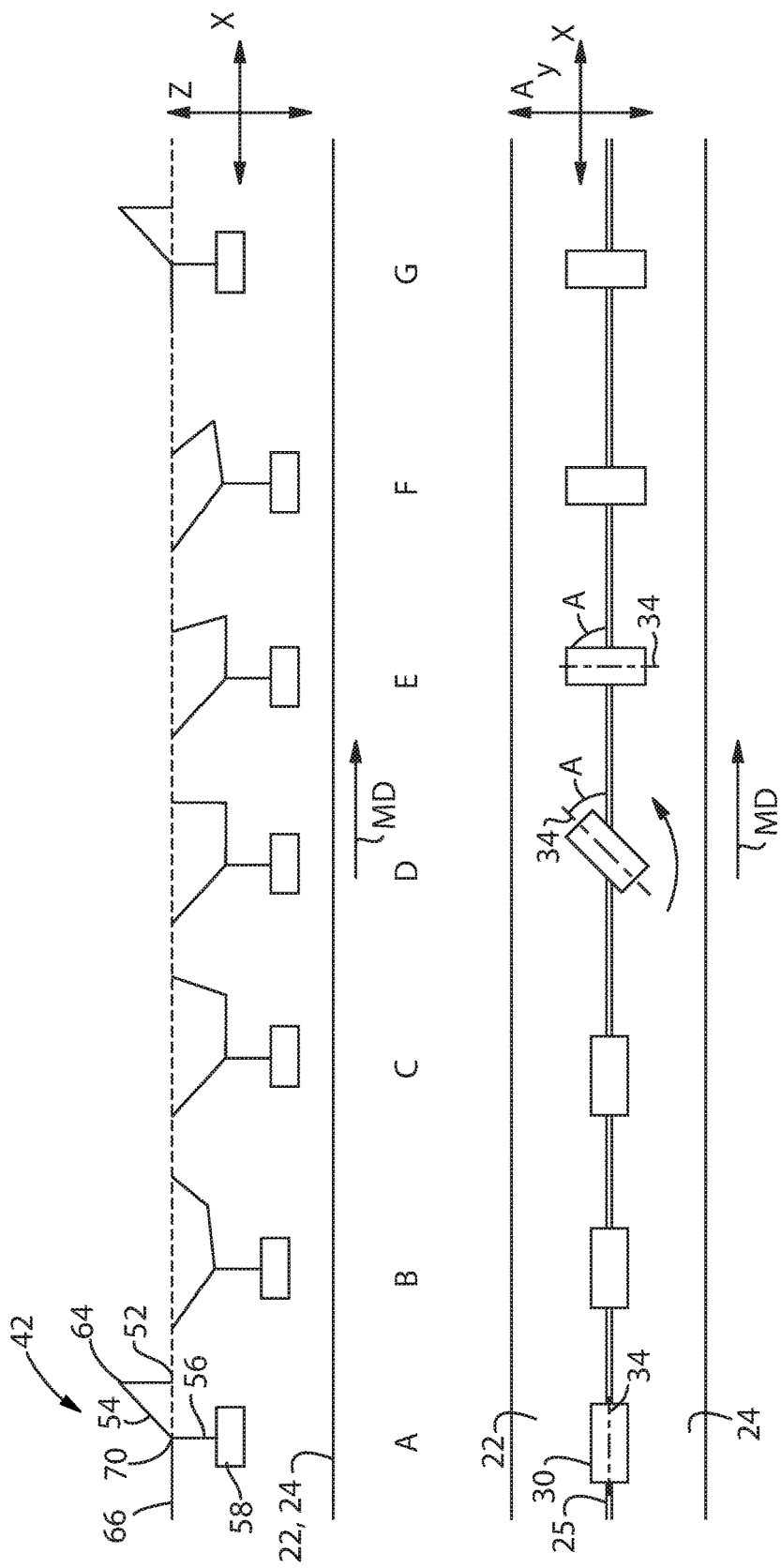
FIG. 5 is a schematic representation showing the movement of a portion of the apparatus of the present invention and resulting roll orientations; the upper portion of FIG. 5 schematically depicts the product rotation portion from a side view and the lower portion of FIG. 5 schematically depicts a top view of the resulting orientation of the products at each stage as they travel down the conveyors.

The upper portion of FIG. 5 depicts the product rotation portion from a side view, and the lower portion of FIG. 5 is a top view depicting the resulting orientation of products at each stage as they travel down the conveyors 22, 24. Accordingly, the motion of the rotator motor 56 and rotator cup 58 are illustrated in the upper portion of FIG. 5, which schematically shows the motion of the rotator assembly in a sequence of positions A-G, and the lower portion of FIG. 5 depicts the rotation of a rolled product (or package of rolled products) in the same sequence of positions A-G. The rotator motor moves in a vertical (i.e., X-Z) plane as it rotates a rolled absorbent product 30 in a horizontal (i.e., X-Y) plane as shown in the lower portion of FIG. 5. The upper part of FIG. 5 shows a series of images representing different positions of rotator motor 56 as it is moved in a via linkage 54 by rotator crank 52. The relevant elements of the rotator assembly 42 are identified in their schematic form in the first image at the left of the series of images. As shown, a rotator cup 58 is attached to a rotator motor 56, which is shown in its fixed position with respect to first end 64 and second end 66 of linkage 54 as well as the rotator motor connection 70. The rolled product 30 orientation shown in the lower portion of FIG. 5 is rendered schematically as a rectangle and in the upper portion the rotator cup 58 is shown in both orientations simultaneously, i.e. before and after rotate, but it is understood that what is depicted can be partially wrapped rolled product in an open-ended tube of polymer film 36 which is being rotated to go to the next unit operation to have the open ends folded and sealed.

At position A, the rotator cup 58 is at its maximum elevation with respect to conveyors 22 and 24 as a rolled absorbent product 30 is moving in the MD on one or both of conveyors 22 and 24 which can each be moving at the same speed. Rolled absorbent product 30 can be oriented such that a roll axis 34 is oriented parallel to the MD, as shown in FIG. 5. The roll axis 34 can be the longitudinal axis in the center of the cardboard tube of a roll of absorbent products, for example. At position B, the rotator cup contacts a rolled absorbent product 30 at a matched velocity to conveyors 22 and 24. At position C rotation of rolled absorbent product 30 in the horizontal plane begins, and at position D the rotator cup is at its minimum elevation relative to the conveyors 22, 24, and, likewise at maximum rolled product compression, and has moved the rolled absorbent product 30 into mid-rotation at which time the roll axis 34 can be at about a 45 degree angle A from MD. At position E rotation of rolled absorbent product 30 is complete, with the roll axis 34 being at about a 90 degree angle A from MD. In some forms of the apparatus/system/method disclosed herein, the rolled absorbent product 30 can be over rotated past an angle A of 90 degrees, and then brought back by the rotator cup before the rotator cup loses contact with the rolled absorbent product, to an angle A of 90 degrees to help square the product. This over rotation past 90 degrees and then brining the product back to 90 degrees at position E helps control the product orientation on the conveyor and minimizes over-rotation when process speeds are increased. At position F, the rolled absorbent product 30 is released at a velocity matched to the velocity of conveyors 22, 24. And at position G, the rotator cup 58 is at its maximum elevation to start the next cycle. While passing through its maximum elevation, an unrotated roll may be allowed to pass underneath to be rotated by a second downstream rotator. In the case of a downstream rotator, a roll that is already rotated by the upstream rotator is allowed to pass underneath.

Between positions B, C, E and F, at which stages the MD velocity of the rotator cup 58 can match the velocity of the conveyors 22, 24. In one form, the MD velocity of the rotator cup should match the conveyors 22, 24 as this is the period in which the cup is acquiring the product and the point at which it gains full control cannot necessarily be known. However, between positions C and E, the velocity of the cup can be varied to effect a predetermined spacing of product on the conveyors, or to allow for a faster cycle time by permitting the rolled product to "slip" back, i.e., move slower than the conveyors to allow more time to make the roll rotation.

Once rotation of the partially wrapped rolled absorbent product 30 is complete, the partially wrapped rolled absorbent product 30 leaves the product rotation portion 20 to the product end sealing portion 26 at which time folding and sealing occurs by means well known in the art to achieve a complete, wrapped package ready for further processing, shipping or storage. Upper stabilizing belts 14 can be optionally supplied to provide for downward pressure on the rotated products to keep them in position for end sealing. For example, single rolls of products can have a tendency to roll due to the forces of the conveyor. Upper stabilizing belts 14 can be positioned at a suitable height, depending on the height of the roll(s) to apply relatively light pressure to the roll(s) and move at the same machine direction rate as the conveyor in the end sealing portion.

In various examples, the invention can be described in non-limiting ways as follows in the following paragraphs.

A. An apparatus for rotating a rolled product, the apparatus comprising:

a. at least one conveyor on which is conveyed at least one rolled product in a machine direction;
b. a rotator assembly moveably attached via a reciprocating linkage to a framework, the rotator assembly being driven by a first motor such that the rotator assembly cycles in a closed path in a vertical plane;
c. the rotator assembly having mounted to the linkage a second motor having a rotator cup, the framework being positioned with respect to the conveyor such that upon each cycle of the rotator assembly the rotator cup cycles close enough to the conveyor such that it can contact the rolled product throughout part of the cycle.

B. The apparatus of Paragraph A, comprising two conveyors running side by side.

C. The apparatus of Paragraphs A or B, wherein each conveyor is driven individually, and one conveyor can be driven at a speed greater than the other.

D. The apparatus of any of Paragraphs A-C, wherein the framework is height-adjustable.

E. The apparatus of any of Paragraphs A-D, wherein the closed path of the rotator assembly approximates an ellipse.

F. The apparatus of any of Paragraphs A-E, wherein the rotator cup grips the rolled product.

G. The apparatus of any of Paragraphs A-F, wherein the rolled product has a roll axis oriented in the machine direction, and wherein the rolled product is partially wrapped in an open-ended tube of polymer film.

H. A conveying system comprising a conveyor on which is conveyed a rolled product in a machine direction, the conveying comprising:
a. a first portion on which is conveyed a rolled product having an axis oriented in the machine direction, wherein the rolled product is partially wrapped in an open ended tube of polymer film;
b. a second portion on which the rolled product is rotated in a horizontal plane such that its axis is oriented in a cross machine direction,
c. a third portion on which the rolled product is conveyed while oriented in the cross machine direction to a sealing operation that seals the open ends of the tube of polymer film.

I. The conveying system of Paragraph H, wherein the second portion comprises a rotator assembly moveably attached via a reciprocating linkage to framework positioned in operable relationship to the second portion, the rotator assembly being driven by a first motor such that the rotator assembly cycles in a closed path in a vertical plane, the rotator assembly having mounted to the linkage a second motor having a rotator cup, the rotator assembly being positioned with respect to the second portion such that upon each cycle the rotator cup contacts a partially wrapped package of rolled product throughout part of the cycle.

J. The conveying system of Paragraph H or I, wherein the third portion conveys partially wrapped rolled products to an end sealing operation.

K. The conveying system of any of Paragraphs H-J, wherein the second portion comprises two conveyors operating side by side.

L. The conveying system of any of Paragraphs H-K, wherein each of the two conveyors is individually driven and can operate at different speeds.

M. The conveying system of any of Paragraphs H-L, wherein rotator assembly is vertically adjustable relative to the second portion.

N. A method for rotating a rolled product, the method comprising the steps of:
a. providing a conveyor moving in a machine direction;
b. providing in operable relationship to the conveyor a product rotator, the product rotator being mounted on a frame in operable relationship to the conveyor and comprising:
 i. a rotator assembly moveably attached via a reciprocating linkage to the frame, the rotator assembly being driven by a first motor such that the rotator assembly cycles in a closed path in a vertical plane;
 ii. the rotator assembly having mounted to the linkage a second motor having a rotator cup, the rotator assembly being positioned with respect to the conveyor such that upon each cycle the rotator cup contacts the rolled product throughout part of the cycle;
c. conveying the rolled product on the conveyor while rotating the rolled product by contacting the rolled product with the rotator cup and reorienting the rolled product in a horizontal plane.

O. The method of Paragraph N, wherein the rolled product is a sanitary tissue product selected from the group of paper towels and toilet tissue.

P. The method of Paragraph N or O, wherein the sanitary tissue product is rolled on a core having a core axis, and the core axis is rotated through 90 degrees when rotated.

Q. The method of any of Paragraphs N-P, wherein the conveyor is a split conveyor comprising two conveyor belts running side by side.

R. The method of any of Paragraphs N-Q, wherein each of the two conveyor belts is driven separately and can be driven at different speeds.

S. A method of any of Paragraphs N-R, wherein the rolled product is partially wrapped in an open-ended polymer tube.

T. The method of any of Paragraphs N-S, further comprising the step of sealing the open ends of the polymer tube to form a polymer-wrapped package of rolled sanitary tissue products.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

What is claimed is:
1. An apparatus for rotating at least one rolled product, the apparatus comprising:

a. at least one conveyor on which is conveyed at least one rolled product in a machine direction;
b. a rotator assembly moveably attached via a reciprocating linkage to a framework, the rotator assembly being driven by a first motor such that the rotator assembly cycles in a closed path in a vertical plane;
c. the rotator assembly having mounted to the linkage a second motor having a rotator cup, the framework being positioned with respect to the conveyor such that upon each cycle of the rotator assembly the rotator cup cycles close enough to the conveyor such that it can contact the rolled product throughout part of the cycle.

2. The apparatus of claim 1, comprising two conveyors running side by side.

3. The apparatus of claim 2, wherein each conveyor is driven individually, and one conveyor can be driven at a speed greater than the other.

4. The apparatus of claim 1, wherein the framework is height-adjustable.

5. The apparatus of claim 1, wherein the closed path of the rotator assembly approximates an ellipse.

6. The apparatus of claim 1, wherein the rotator cup grips the rolled product.

7. The apparatus of claim 1, wherein the at least one rolled product has a roll axis oriented in the machine direction, and wherein the at least one rolled product is partially wrapped in an open-ended tube of polymer film.

8. The apparatus of claim 1, wherein the at least one rolled product is an individual rolled product.

9. The apparatus of claim 1, wherein the at least one rolled product is multiple rolled products that are bundled in an open-ended tube of polymer film.

10. A conveying system comprising a conveyor on which is conveyed at least one rolled product in a machine direction, the conveying comprising:
a. a first portion on which is conveyed at least one rolled product having an axis oriented in the machine direction, wherein the at least one rolled product is partially wrapped in an open ended tube of polymer film;
b. a second portion on which the at least one rolled product is rotated in a horizontal plane such that its axis is oriented in a cross machine direction,
c. a third portion on which the at least one rolled product is conveyed while oriented in the cross machine direction to a sealing operation that seals the open ends of the tube of polymer film;
wherein the second portion comprises a rotator assembly moveably attached via a reciprocating linkage to framework positioned in operable relationship to the second portion, the rotator assembly being driven by a first motor such that the rotator assembly cycles in a closed path in a vertical plane, the rotator assembly having mounted to the linkage a second motor having a rotator cup, the rotator assembly being positioned with respect to the second portion such that upon each cycle the rotator cup contacts a partially wrapped package of rolled product throughout part of the cycle.

11. The conveying system of claim 10, wherein the third portion conveys partially wrapped rolled products to an end sealing operation.

12. The conveying system of claim 10, wherein the second portion comprises two conveyors operating side by side.

13. The conveying system of claim 12, wherein each of the two conveyors is individually driven and can operate at different speeds.

14. The conveying system of claim 10, wherein rotator assembly is vertically adjustable relative to the second portion.

15. The conveying system of claim 10, wherein the at least one rolled product is an individual rolled product.

16. The conveying system of claim 10, wherein the at least one rolled product is multiple rolled products that are bundled in an open-ended tube of polymer film.

17. A method for rotating at least one rolled product, the method comprising the steps of:
a. providing a conveyor moving in a machine direction;
b. providing in operable relationship to the conveyor a product rotator, the product rotator being mounted on a frame in operable relationship to the conveyor and comprising:
1. a rotator assembly moveably attached via a reciprocating linkage to the frame, the rotator assembly being driven by a first motor such that the rotator assembly cycles in a closed path in a vertical plane;
2. the rotator assembly having mounted to the linkage a second motor having a rotator cup, the rotator assembly being positioned with respect to the conveyor such that upon each cycle the rotator cup contacts the rolled product throughout part of the cycle;
c. conveying the at least one rolled product on the conveyor while rotating the at least one rolled product by contacting the at least one rolled product with the rotator cup and reorienting the at least one rolled product in a horizontal plane.

18. The method of claim 17, wherein the at least one rolled product is a sanitary tissue product selected from the group of paper towels and toilet tissue.

19. The method of claim 17, wherein the sanitary tissue product is rolled on a core having a core axis, and the core axis is rotated by about 90 degrees when rotated.

20. The method of claim 17, wherein the conveyor is a split conveyor comprising two conveyor belts running side by side.

21. The method of claim 17, wherein each of the two conveyor belts is driven separately and can be driven at different speeds.

22. A method of claim 17, wherein the at least one rolled product is partially wrapped in an open-ended polymer tube.

23. The method of claim 22, further comprising the step of sealing the open ends of the polymer tube to form a polymer-wrapped package of rolled sanitary tissue products.

24. The apparatus of claim 17, wherein the at least one rolled product is an individual rolled product.

25. The apparatus of claim 17, wherein the at least one rolled product is multiple rolled products that are bundled in an open-ended tube of polymer film.

* * * * *